(12) United States Patent
Sayed et al.

(10) Patent No.: US 9,228,141 B2
(45) Date of Patent: Jan. 5, 2016

(54) INTEGRATED HYDROPROCESSING, STEAM PYROLYSIS AND SLURRY HYDROPROCESSING OF CRUDE OIL TO PRODUCE PETROCHEMICALS

(71) Applicants: Esam Sayed, Al-Khobar (SA); Raheel Shafi, Dhahran (SA); Abdul Rahman Zafer Akhras, Dhahran (SA); Abdennour Bourane, Ras Tanura (SA); Ibrahim A. Abba, Dhahran (SA)

(72) Inventors: Esam Sayed, Al-Khobar (SA); Raheel Shafi, Dhahran (SA); Abdul Rahman Zafer Akhras, Dhahran (SA); Abdennour Bourane, Ras Tanura (SA); Ibrahim A. Abba, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 272 days.

(21) Appl. No.: 13/847,959

(22) Filed: Mar. 20, 2013

(65) Prior Publication Data

US 2013/0248417 A1 Sep. 26, 2013

Related U.S. Application Data

(60) Provisional application No. 61/613,294, filed on Mar. 20, 2012, provisional application No. 61/785,894, filed on Mar. 14, 2013.

(51) Int. Cl.
*C10G 69/06* (2006.01)
*B01D 17/02* (2006.01)
(Continued)

(52) U.S. Cl.
CPC ............ *C10G 69/06* (2013.01); *B01D 17/0217* (2013.01); *B01D 19/0057* (2013.01); *B01J 21/04* (2013.01); *B01J 27/051* (2013.01); *B01J 27/0515* (2013.01); *B01J 35/1014* (2013.01); *B01J 35/1042* (2013.01); *B01J 35/1047* (2013.01); *B01J 35/1061* (2013.01); *C10G 9/16* (2013.01); *C10G 47/26* (2013.01); *C10G 49/12* (2013.01); *C10G 65/08* (2013.01); *C10G 65/12* (2013.01); *C10G 65/14* (2013.01); *C10G 69/00* (2013.01); *C10G 70/02* (2013.01); *C10G 2300/201* (2013.01); *C10G 2300/308* (2013.01); *C10G 2400/20* (2013.01); *C10G 2400/22* (2013.01); *C10G 2400/30* (2013.01)

(58) Field of Classification Search
CPC ............ C10G 9/00; C10G 9/005; C10G 9/14; C10G 9/18; C10G 51/06; C10G 69/06
See application file for complete search history.

(56) References Cited

U.S. PATENT DOCUMENTS

| | | | |
|---|---|---|---|
| 3,842,138 A | 10/1974 | Chahvekilan et al. | |
| 3,944,481 A | 3/1976 | Wing et al. | |

(Continued)

FOREIGN PATENT DOCUMENTS

| | | | |
|---|---|---|---|
| WO | 2007047942 A2 | 4/2007 | |
| WO | 2009088413 A1 | 7/2009 | |

OTHER PUBLICATIONS

PCT/US2013/033181, International Search Report and Written Opinion dated Jun. 25, 2013, 18 pages.

*Primary Examiner* — Brian McCaig
(74) *Attorney, Agent, or Firm* — Abelman, Frayne & Schwab

(57) ABSTRACT

Crude oil is charged to a hydroprocessing zone in the presence of hydrogen operating under conditions effective to produce a hydroprocessed effluent, which is thermally cracked in the presence of steam in a steam pyrolysis zone to produce a mixed product stream. Heavy components, which are derived from one or more of the hydroprocessed effluent, a heated stream within the steam pyrolysis zone, or the mixed product stream catalytically cracking are charged to a slurry hydroprocessing zone to produce a slurry intermediate product which is then thermally cracked. Olefins and aromatics are recovered from the separated mixed product stream as product.

13 Claims, 3 Drawing Sheets

(51) Int. Cl.

| | | |
|---|---|---|
| *B01D 19/00* | (2006.01) | |
| *B01J 27/051* | (2006.01) | |
| *C10G 47/26* | (2006.01) | |
| *C10G 49/12* | (2006.01) | |
| *C10G 65/08* | (2006.01) | |
| *C10G 65/12* | (2006.01) | |
| *C10G 65/14* | (2006.01) | |
| *C10G 70/02* | (2006.01) | |
| *C10G 9/16* | (2006.01) | |
| *C10G 69/00* | (2006.01) | |
| *B01J 21/04* | (2006.01) | |
| *B01J 35/10* | (2006.01) | |
| *C10G 9/00* | (2006.01) | |
| *C10G 9/14* | (2006.01) | |
| *C10G 51/06* | (2006.01) | |

(56) References Cited

U.S. PATENT DOCUMENTS

| | | | |
|---|---|---|---|
| 4,002,556 A | 1/1977 | Satchell | |
| 4,065,379 A | 12/1977 | Soonawala et al. | |
| 4,115,467 A | 9/1978 | Fowler | |
| 4,180,453 A | 12/1979 | Franck et al. | |
| 4,798,665 A | 1/1989 | Humbach et al. | |
| 5,192,421 A | 3/1993 | Audeh et al. | |
| 5,258,117 A | 11/1993 | Kolstad et al. | |
| 5,755,955 A * | 5/1998 | Benham et al. | 208/112 |
| 5,906,728 A | 5/1999 | Iaccino et al. | |
| 6,190,533 B1 | 2/2001 | Bradow et al. | |
| 6,210,561 B1 | 4/2001 | Bradow et al. | |
| 6,303,842 B1 | 10/2001 | Bridges et al. | |
| 6,632,351 B1 | 10/2003 | Ngan et al. | |
| 7,220,887 B2 | 5/2007 | Stell et al. | |
| 7,311,746 B2 | 12/2007 | Stell et al. | |
| 7,408,093 B2 | 8/2008 | Stell et al. | |
| 7,951,745 B2 | 5/2011 | Zhou et al. | |
| 7,972,498 B2 | 7/2011 | Buchanan et al. | |
| 8,070,938 B2 * | 12/2011 | Stein et al. | 208/130 |
| 8,071,833 B2 | 12/2011 | Grootjans et al. | |
| 2004/0004028 A1 | 1/2004 | Stell et al. | |
| 2004/0054247 A1 | 3/2004 | Powers | |
| 2005/0261530 A1 | 11/2005 | Stell et al. | |
| 2007/0090018 A1* | 4/2007 | Keusenkothen et al. | 208/106 |
| 2007/0090020 A1* | 4/2007 | Buchanan et al. | 208/106 |
| 2007/0232846 A1 | 10/2007 | Baumgartner et al. | |
| 2010/0087692 A1 | 4/2010 | Yoshimura et al. | |
| 2011/0042269 A1 | 2/2011 | Kuechler et al. | |
| 2011/0174682 A1 | 7/2011 | Iaccino | |
| 2011/0247500 A1 | 10/2011 | Akhras et al. | |

* cited by examiner

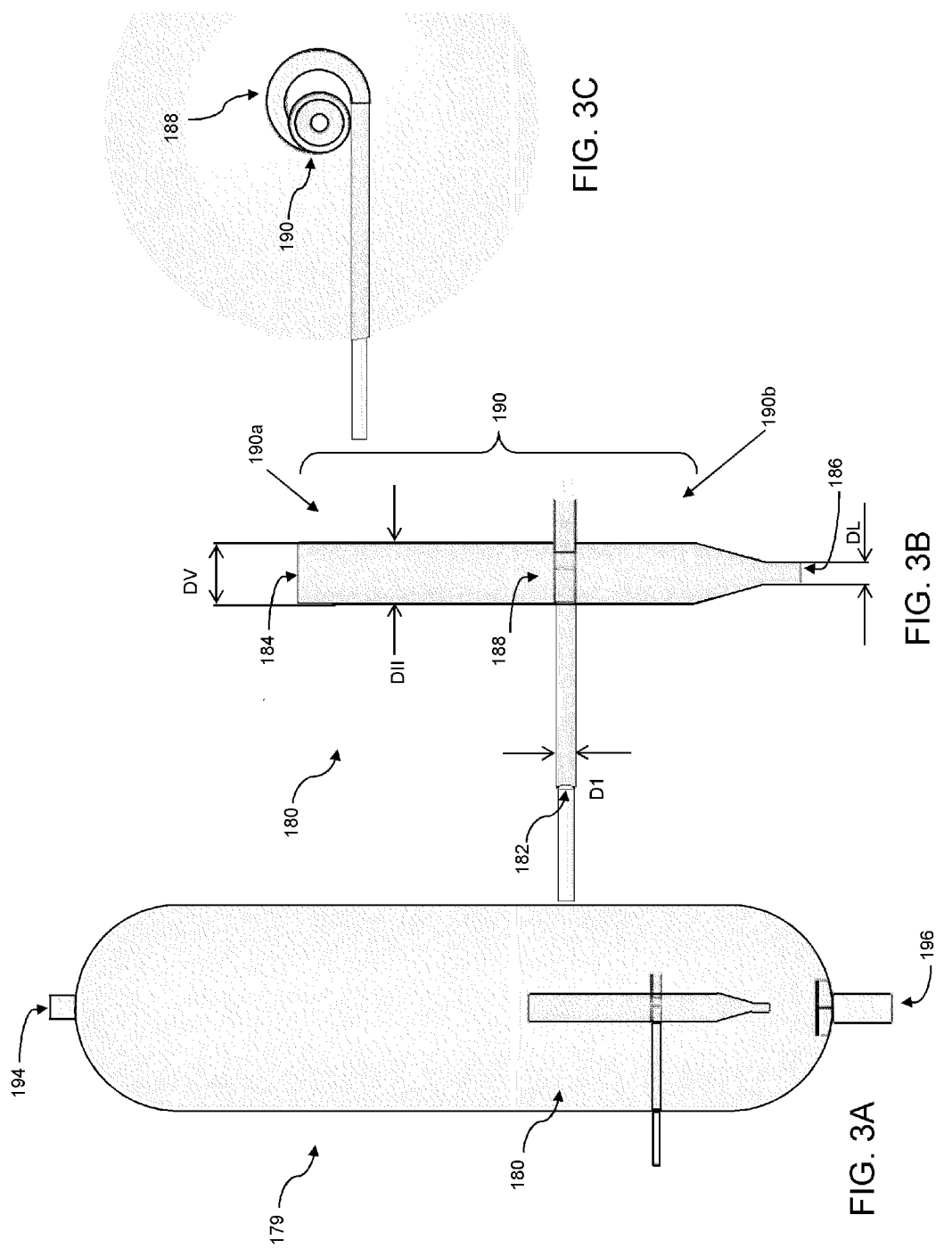

INTEGRATED HYDROPROCESSING, STEAM PYROLYSIS AND SLURRY HYDROPROCESSING OF CRUDE OIL TO PRODUCE PETROCHEMICALS

RELATED APPLICATIONS

This application claims the benefit of priority of U.S. Provisional Patent Application No. 61/613,294 filed Mar. 20, 2012 and 61/785,894 filed Mar. 14, 2013, which are incorporated by reference herein.

BACKGROUND OF THE INVENTION

1. Field of the Invention

The present invention relates to an integrated hydroprocessing, steam pyrolysis and slurry hydroprocessing process for production of petrochemicals such as light olefins and aromatics from feeds, including crude oil.

2. Description of Related Art

The lower olefins (i.e., ethylene, propylene, butylene and butadiene) and aromatics (i.e., benzene, toluene and xylene) are basic intermediates which are widely used in the petrochemical and chemical industries. Thermal cracking, or steam pyrolysis, is a major type of process for forming these materials, typically in the presence of steam, and in the absence of oxygen. Feedstocks for steam pyrolysis can include petroleum gases and distillates such as naphtha, kerosene and gas oil. The availability of these feedstocks is usually limited and requires costly and energy-intensive process steps in a crude oil refinery.

Studies have been conducted using heavy hydrocarbons as a feedstock for steam pyrolysis reactors. A major drawback in conventional heavy hydrocarbon pyrolysis operations is coke formation. For example, a steam cracking process for heavy liquid hydrocarbons is disclosed in U.S. Pat. No. 4,217,204 in which a mist of molten salt is introduced into a steam cracking reaction zone in an effort to minimize coke formation. In one example using Arabian light crude oil having a Conradson carbon residue of 3.1% by weight, the cracking apparatus was able to continue operating for 624 hours in the presence of molten salt. In a comparative example without the addition of molten salt, the steam cracking reactor became clogged and inoperable after just 5 hours because of the formation of coke in the reactor.

In addition, the yields and distributions of olefins and aromatics using heavy hydrocarbons as a feedstock for a steam pyrolysis reactor are different than those using light hydrocarbon feedstocks. Heavy hydrocarbons have a higher content of aromatics than light hydrocarbons, as indicated by a higher Bureau of Mines Correlation Index (BMCI). BMCI is a measurement of aromaticity of a feedstock and is calculated as follows:

$$BMCI = 87552/VAPB + 473.5*(sp.\ gr.) - 456.8 \quad (1)$$

where:
VAPB=Volume Average Boiling Point in degrees Rankine and
sp. gr.=specific gravity of the feedstock.

As the BMCI decreases, ethylene yields are expected to increase. Therefore, highly paraffinic or low aromatic feeds are usually preferred for steam pyrolysis to obtain higher yields of desired olefins and to avoid higher undesirable products and coke formation in the reactor coil section.

The absolute coke formation rates in a steam cracker have been reported by Cai et al., "Coke Formation in Steam Crackers for Ethylene Production," Chem. Eng. & Proc., vol. 41, (2002), 199-214. In general, the absolute coke formation rates are in the ascending order of olefins>aromatics>paraffins, where olefins represent heavy olefins.

To be able to respond to the growing demand of these petrochemicals, other type of feeds which can be made available in larger quantities, such as raw crude oil, are attractive to producers. Using crude oil feeds will minimize or eliminate the likelihood of the refinery being a bottleneck in the production of these necessary these petrochemicals.

SUMMARY OF THE INVENTION

The system and process herein provides a steam pyrolysis zone integrated with a hydroprocessing zone and a slurry hydroprocessing zone to permit direct processing of feedstocks including crude oil feedstocks to produce petrochemicals including olefins and aromatics.

Crude oil is charged to a hydroprocessing zone in the presence of hydrogen operating under conditions effective to produce a hydroprocessed effluent reduced having a reduced content of contaminants, an increased paraffinicity, reduced Bureau of Mines Correlation Index, and an increased American Petroleum Institute gravity. Hydroprocessed effluent is thermally cracked in the presence of steam in a steam pyrolysis zone to produce a mixed product stream. Heavy components, which are derived from one or more of the hydroprocessed effluent, a heated stream within the steam pyrolysis zone, or the mixed product stream from steam cracking, are charged to a slurry hydroprocessing zone to produce a slurry intermediate product which is then thermally cracked. Olefins and aromatics are recovered from the separated mixed product stream as product.

As used herein, the term "crude oil" is to be understood to include whole crude oil from conventional sources, including crude oil that has undergone some pre-treatment. The term crude oil will also be understood to include that which has been subjected to water-oil separations; and/or gas-oil separation; and/or desalting; and/or stabilization.

Other aspects, embodiments, and advantages of the process of the present invention are discussed in detail below. Moreover, it is to be understood that both the foregoing information and the following detailed description are merely illustrative examples of various aspects and embodiments, and are intended to provide an overview or framework for understanding the nature and character of the claimed features and embodiments. The accompanying drawings are illustrative and are provided to further the understanding of the various aspects and embodiments of the process of the invention.

BRIEF DESCRIPTION OF THE DRAWINGS

The invention will be described in further detail below and with reference to the attached drawings where:

FIGS. 3A-3C are schematic illustrations in section, enlarged section and top section views of a vapor-liquid separation device in a flash vessel used in certain embodiments of a the integrated process described herein.

DETAILED DESCRIPTION OF THE INVENTION

Figure 1:
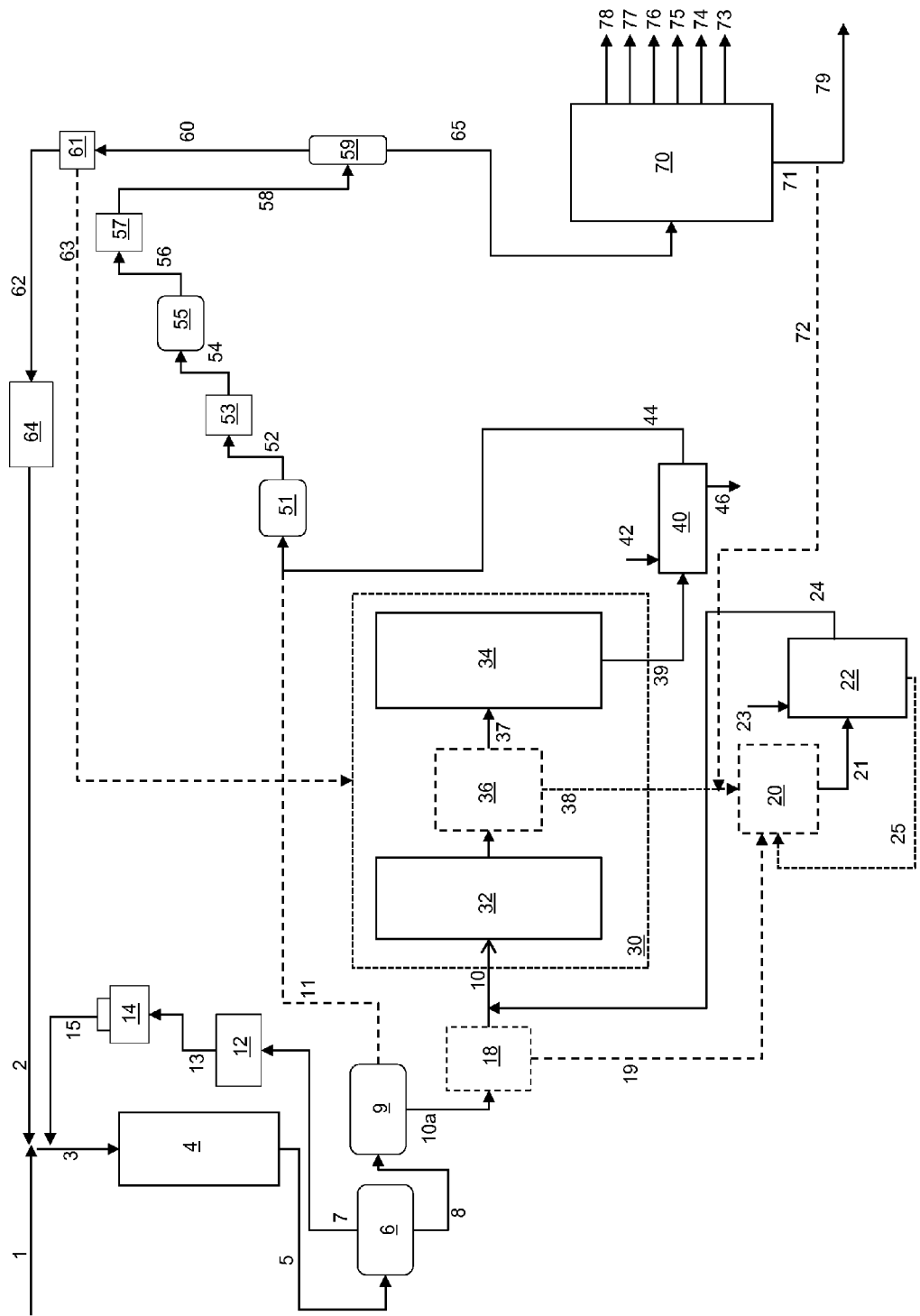
FIG. 1 is a process flow diagram of an embodiment of an integrated process described herein.

A process flow diagram including integrated hydroprocessing, steam pyrolysis and slurry hydroprocessing is shown in FIG. 1. The integrated system generally includes a selective hydroprocessing zone, a steam pyrolysis zone, a slurry hydroprocessing zone and a product separation zone.

The selective hydroprocessing zone generally includes a hydroprocessing reaction zone 4 having an inlet for receiving a mixture 3 containing a feed 1 and hydrogen 2 recycled from the steam pyrolysis product stream, and make-up hydrogen as necessary (not shown). Hydroprocessing reaction zone 4 further includes an outlet for discharging a hydroprocessed effluent 5.

Reactor effluents 5 from the hydroprocessing reaction zone 4 are cooled in a heat exchanger (not shown) and sent to a high pressure separator 6. The separator tops 7 are cleaned in an amine unit 12 and a resulting hydrogen rich gas stream 13 is passed to a recycling compressor 14 to be used as a recycle gas 15 in the hydroprocessing reactor. A bottoms stream 8 from the high pressure separator 6, which is in a substantially liquid phase, is cooled and introduced to a low pressure cold separator 9, where it is separated into a gas stream and a liquid stream 10. Gases from low pressure cold separator includes hydrogen, $H_2S$, $NH_3$ and any light hydrocarbons such as $C_1$-$C_4$ hydrocarbons. Typically these gases are sent for further processing such as flare processing or fuel gas processing. According to certain embodiments of the process and system herein, hydrogen and other hydrocarbons are recovered from stream 11 by combining it with steam cracker products 44 as a combined feed to the product separation zone. All or a portion of liquid stream 10a serves as the hydroprocessed cracking feed to the steam pyrolysis zone 30.

Steam pyrolysis zone 30 generally comprises a convection section 32 and a pyrolysis section that can operate based on steam pyrolysis unit operations known in the art, i.e., charging the thermal cracking feed to the convection section in the presence of steam.

In certain embodiments, a vapor-liquid separation zone 36 is included between sections 32 and 34. Vapor-liquid separation zone 36, through which the heated cracking feed from the convection section 32 passes and is fractioned, can be a flash separation device, a separation device based on physical or mechanical separation of vapors and liquids or a combination including at least one of these types of devices.

In additional embodiments, a vapor-liquid separation zone 18 is included upstream of section 32. Stream 10a is fractioned into a vapor phase and a liquid phase in vapor-liquid separation zone 18, which can be a flash separation device, a separation device based on physical or mechanical separation of vapors and liquids or a combination including at least one of these types of devices.

Useful vapor-liquid separation devices are illustrated by, and with reference to FIGS. 2A-2C and 3A-3C. Similar arrangements of vapor-liquid separation devices are described in U.S. Patent Publication Number 2011/0247500 which is incorporated herein by reference in its entirety. In this device vapor and liquid flow through in a cyclonic geometry whereby the device operates isothermally and at very low residence time (in certain embodiments less than 10 seconds), and with a relatively low pressure drop (in certain embodiments less than 0.5 bars). In general vapor is swirled in a circular pattern to create forces where heavier droplets and liquid are captured and channeled through to a liquid outlet as liquid residue which can be passed to slurry hydroprocessing zone 22 (optionally via the slurry hydroprocessing blending unit 20), and vapor is channeled through a vapor outlet. In embodiments in which a vapor-liquid separations device 36 is provided, the liquid phase 38 is discharged as residue and the vapor phase is the charge 37 to the pyrolysis section 34. In embodiments in which a vapor-liquid separation device 18 is provided, the liquid phase 19 is discharged as the residue and the vapor phase is the charge 10 to the convection section 32. The vaporization temperature and fluid velocity are varied to adjust the approximate temperature cutoff point, for instance in certain embodiments compatible with the residue fuel oil blend, e.g. about 540° C.

In the process herein, all rejected residuals or bottoms recycled, e.g., streams 19, 38 and 72, have been subjected to the hydroprocessing zone and contain a reduced amount of heteroatom compounds including sulfur-containing, nitrogen-containing and metal compounds as compared to the initial feed. All or a portion of these residual streams can be charged to the slurry hydroprocessing zone 22 (optionally via the slurry hydroprocessing blending unit 20) as described herein.

A quenching zone 40 is also integrated downstream of the steam pyrolysis zone 30 and includes an inlet in fluid communication with the outlet of steam pyrolysis zone 30 for receiving mixed product stream 39, an inlet for admitting a quenching solution 42, an outlet for discharging a quenched mixed product stream 44 to the separation zone and an outlet for discharging quenching solution 46.

In general, an intermediate quenched mixed product stream 44 is converted into intermediate product stream 65 and hydrogen 62. The recovered hydrogen is purified and used as recycle hydrogen stream 2 in the hydroprocessing reaction zone. Intermediate product stream 65 is generally fractioned into end-products and residue in separation zone 70, which can be one or multiple separation units, such as plural fractionation towers including de-ethanizer, de-propanizer, and de-butanizer towers as is known to one of ordinary skill in the art. For example, suitable apparatus are described in "Ethylene," Ullmann's Encyclopedia of Industrial Chemistry, Volume 12, Pages 531-581, in particular FIG. 24, FIG. 25 and FIG. 26, which is incorporated herein by reference.

Product separation zone 70 is in fluid communication with the product stream 65 and includes plural products 73-78, including an outlet 78 for discharging methane, an outlet 77 for discharging ethylene, an outlet 76 for discharging propylene, an outlet 75 for discharging butadiene, an outlet 74 for discharging mixed butylenes, and an outlet 73 for discharging pyrolysis gasoline. Additionally pyrolysis fuel oil 71 is recovered, e.g., as a low sulfur fuel oil blend to be further processed in an off-site refinery. A portion 72 of the discharged pyrolysis fuel oil can be charged to the slurry hydroprocessing zone (as indicated by dashed lines). Note that while six product outlets are shown along with the hydrogen recycle outlet and the bottoms outlet, fewer or more can be provided depending, for instance, on the arrangement of separation units employed and the yield and distribution requirements.

Slurry hydroprocessing zone 22 can include existing or improved (i.e., yet to be developed) slurry hydroprocessing operations (or series of unit operations) that converts the comparably low value residuals or bottoms (e.g., conventionally from the vacuum distillation column or the atmospheric distillation column, and in the present system from the steam pyrolysis zone 30) into relatively lower molecular weight hydrocarbon gases, naphtha, and light and heavy gas oils. The charge to slurry hydroprocessing zone 22 includes all or a portion of bottoms 19 from vapor-liquid separation zone 18 or all or a portion of bottoms 38 from vapor-liquid separation zone 36. Additionally as described herein all or a portion 72 of pyrolysis fuel oil 71 from product separation zone 70 can be combined as the charge to slurry hydroprocessing zone 22.

Slurry bed reactor unit operations are characterized by the presence of catalyst particles having very small average dimensions that can be efficiently dispersed uniformly and maintained in the medium, so that the hydrogenation processes are efficient and immediate throughout the volume of the reactor. Slurry phase hydroprocessing operates at relatively high temperatures (400° C.-500° C.) and high pressures (100 bars-230 bars). Because of the high severity of the process, a relatively higher conversion rate can be achieved. The catalysts can be homogeneous or heterogeneous and are designed to be functional at high severity conditions. The mechanism is a thermal cracking process and is based on free radical formation. The free radicals formed are stabilized with hydrogen in the presence of catalysts, thereby preventing the coke formation. The catalysts facilitate the partial hydrogenation of heavy feedstock prior to cracking and thereby reduce the formation of longer chain compounds.

The catalysts used in the slurry hydrocracking process can be small particles or can be introduced as an oil soluble precursor, generally in the form of a sulfide of the metal that is formed during the reaction or in a pretreatment step. The metals that make up the dispersed catalysts are generally one or more transition metals, which can be selected from Mo, W, Ni, Co and/or Ru. Molybdenum and tungsten are especially preferred since their performance is superior to vanadium or iron, which in turn are preferred over nickel, cobalt or ruthenium. The catalysts can be used at a low concentration, e.g., a few hundred parts per million (ppm), in a once-through arrangement, but are not especially effective in upgrading of the heavier products under those conditions. To obtain better product quality, catalysts are used at higher concentration, and it is necessary to recycle the catalyst in order to make the process sufficiently economical. The catalysts can be recovered using methods such as settling, centrifugation or filtration.

In general, a slurry bed reactor can be a two-or-three phase reactor, depending on the type of catalysts utilized. It can be a two-phase system of gas and liquid when the homogeneous catalysts are employed or a three-phase system of gas, liquid and solid when small particle size heterogeneous catalysts are employed. The soluble liquid precursor or small particle size catalysts permit high dispersion of catalysts in the liquid and produce an intimate contact between the catalysts and feedstock resulting in a high conversion rate.

Effective processing conditions for a slurry bed hydroprocessing zone 22 in the system and process herein include a reaction temperature of between 375 and 450° C. and a reaction pressure of between 30 and 180 bars. Suitable catalysts include unsupported nano size active particles produced in situ from oil soluble catalyst precursors, including, for example one group VIII metal (Co or Ni) and one group VI metal (Mo or W) in the sulfide form.

In a process employing the arrangement shown in FIG. 1, feedstock 1 is admixed with an effective amount of hydrogen 2 and 15 (and optionally make-up hydrogen, not shown), and the mixture 3 is charged to the inlet of selective hydroprocessing reaction zone 4 at a temperature in the range of from 300° C. to 450° C. In certain embodiments, hydroprocessing reaction zone 4 includes one or more unit operations as described in commonly owned United States Patent Publication Number 2011/0083996 and in PCT Patent Application Publication Numbers WO2010/009077, WO2010/009082, WO2010/009089 and WO2009/073436, all of which are incorporated by reference herein in their entireties. For instance, a hydroprocessing reaction zone can include one or more beds containing an effective amount of hydrodemetallization catalyst, and one or more beds containing an effective amount of hydroprocessing catalyst having hydrodearomatization, hydrodenitrogenation, hydrodesulfurization and/or hydrocracking functions. In additional embodiments hydroprocessing reaction zone 4 includes more than two catalyst beds. In further embodiments hydroprocessing reaction zone 4 includes plural reaction vessels each containing catalyst beds of different function.

Hydroprocessing reaction zone 4 operates under parameters effective to hydrodemetallize, hydrodearomatize, hydrodenitrogenate, hydrodesulfurize and/or hydrocrack the oil feedstock, which in certain embodiments is crude oil. In certain embodiments, hydroprocessing is carried out using the following conditions: operating temperature in the range of from 300° C. to 450° C.; operating pressure in the range of from 30 bars to 180 bars; and a liquid hour space velocity in the range of from $0.1\,h^{-1}$ to $10\,h^{-1}$. Notably, using crude oil as a feedstock in the hydroprocessing reaction zone 4 advantages are demonstrated, for instance, as compared to the same hydroprocessing unit operation employed for atmospheric residue. For instance, at a start or run temperature in the range of 370° C. to 375° C., the deactivation rate is around 1° C./month. In contrast, if residue were to be processed, the deactivation rate would be closer to about 3° C./month to 4° C./month. The treatment of atmospheric residue typically employs pressure of around 200 bars whereas the present process in which crude oil is treated can operate at a pressure as low as 100 bars. Additionally to achieve the high level of saturation required for the increase in the hydrogen content of the feed, this process can be operated at a high throughput when compared to atmospheric residue. The LHSV can be as high as $0.5\,h^{-1}$ while that for atmospheric residue is typically $0.25\,h^{-1}$. An unexpected finding is that the deactivation rate when processing crude oil is going in the inverse direction from that which is usually observed. Deactivation at low throughput ($0.25\,hr^{-1}$) is 4.2° C./month and deactivation at higher throughput ($0.5\,hr^{-1}$) is 2.0° C./month. With every feed which is considered in the industry, the opposite is observed. This can be attributed to the washing effect of the catalyst.

Reactor effluents 5 from the hydroprocessing zone 4 are cooled in an exchanger (not shown) and sent to a high pressure cold or hot separator 6. Separator tops 7 are cleaned in an amine unit 12 and the resulting hydrogen rich gas stream 13 is passed to a recycling compressor 14 to be used as a recycle gas 15 in the hydroprocessing reaction zone 4. Separator bottoms 8 from the high pressure separator 6, which are in a substantially liquid phase, are cooled and then introduced to a low pressure cold separator 9. Remaining gases, stream 11, including hydrogen, $H_2S$, $NH_3$ and any light hydrocarbons, which can include $C_1$-$C_4$ hydrocarbons, can be conventionally purged from the low pressure cold separator and sent for further processing, such as flare processing or fuel gas processing. In certain embodiments of the present process, hydrogen is recovered by combining stream 11 (as indicated by dashed lines) with the cracking gas, stream 44 from the steam cracker products.

In certain embodiments the bottoms stream 10a is the feed 10 to the steam pyrolysis zone 30. In further embodiments, bottoms 10a from the low pressure separator 9 are sent to separation zone 18 wherein the discharged vapor portion is the feed 10 to the steam pyrolysis zone 30. The vapor portion can have, for instance, an initial boiling point corresponding to that of the stream 10a and a final boiling point in the range of about 350° C. to about 600° C. Separation zone 18 can include a suitable vapor-liquid separation unit operation such as a flash vessel, a separation device based on physical or mechanical separation of vapors and liquids or a combination including at least one of these types of devices. Certain embodiments of vapor-liquid separation devices, as standalone devices or installed at the inlet of a flash vessel, are described herein with respect to FIGS. 2A-2C and 3A-3C, respectively.

The steam pyrolysis feed 10 contains a reduced content of contaminants (i.e., metals, sulfur and nitrogen), an increased paraffinicity, reduced BMCI, and an increased American Petroleum Institute (API) gravity. The steam pyrolysis feed 10, which contains an increased hydrogen content as compared to the feed 1 is conveyed to the inlet of convection section 32 of steam pyrolysis zone 30 in the presence of an effective amount of steam, e.g., admitted via a steam inlet. In the convection section 32 the mixture is heated to a predetermined temperature, e.g., using one or more waste heat streams or other suitable heating arrangement. In certain embodiments the mixture is heated to a temperature in the range of from 400° C. to 600° C. and material with a boiling point below the predetermined temperature is vaporized.

The steam pyrolysis zone 30 operates under parameters effective to crack feed 10 into desired products including ethylene, propylene, butadiene, mixed butenes and pyrolysis gasoline. In certain embodiments, steam cracking is carried out using the following conditions: a temperature in the range of from 400° C. to 900° C. in the convection section and in the pyrolysis section; a steam-to-hydrocarbon ratio in the in the convection section in the range of from 0.3:1 to 2:1; and a residence time in the convection section and in the pyrolysis section in the range of from 0.05 seconds to 2 seconds.

Figure 2B:
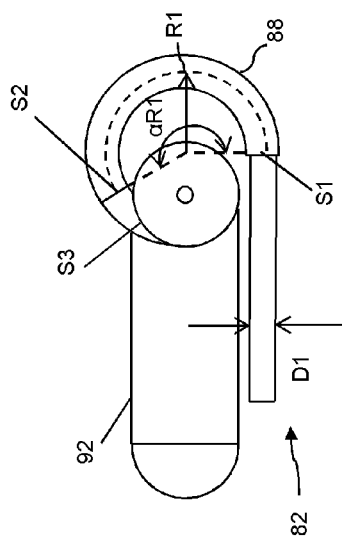
FIG. 2A-2C are schematic illustrations in perspective, top and side views of a vapor-liquid separation device used in certain embodiments of the integrated process described herein.
Figure 2C:
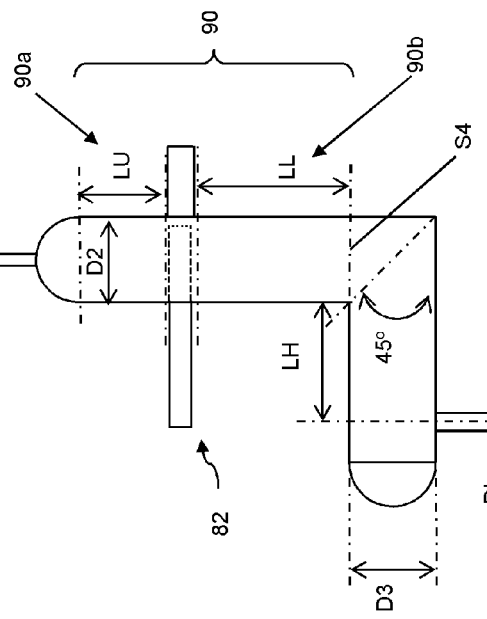
Figure 2A:
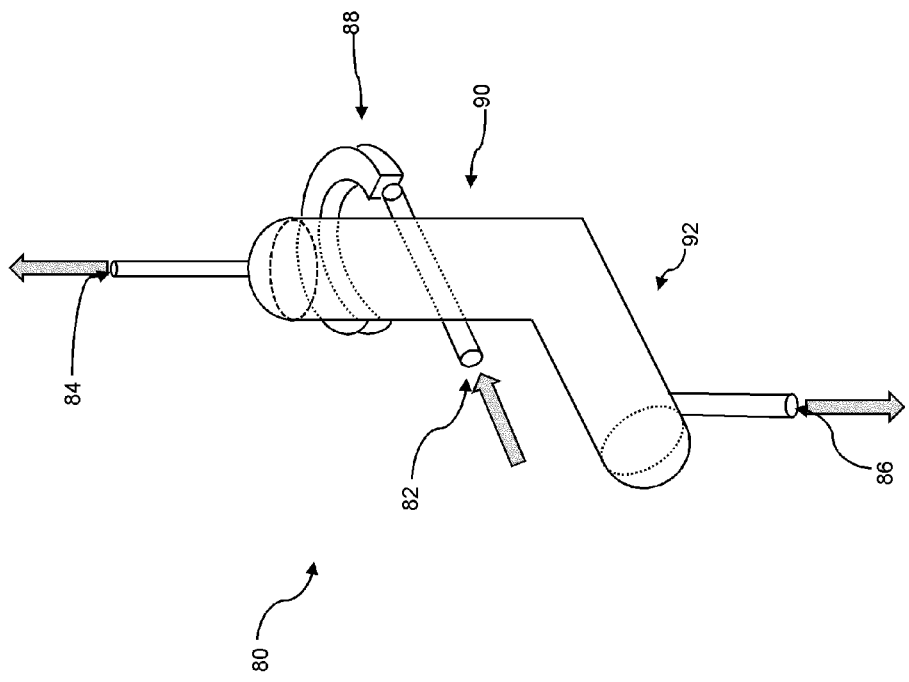

In certain embodiments, the vapor-liquid separation zone 36 includes one or a plurality of vapor liquid separation devices 80 as shown in FIGS. 2A-2C. The vapor liquid separation device 80 is economical to operate and maintenance free since it does not require power or chemical supplies. In general, device 80 comprises three ports including an inlet port 82 for receiving a vapor-liquid mixture, a vapor outlet port 84 and a liquid outlet port 86 for discharging and the collection of the separated vapor and liquid phases, respectively. Device 80 operates based on a combination of phenomena including conversion of the linear velocity of the incoming mixture into a rotational velocity by the global flow pre-rotational section, a controlled centrifugal effect to pre-separate the vapor from liquid, and a cyclonic effect to promote separation of vapor from the liquid. To attain these effects, device 80 includes a pre-rotational section 88, a controlled cyclonic vertical section 90 and a liquid collector/settling section 92.

As shown in FIG. 2B, the pre-rotational section 88 includes a controlled pre-rotational element between cross-section (S1) and cross-section (S2), and a connection element to the controlled cyclonic vertical section 90 and located between cross-section (S2) and cross-section (S3). The vapor liquid mixture coming from inlet 82 having a diameter (D1) enters the apparatus tangentially at the cross-section (S1). The area of the entry section (S1) for the incoming flow is at least 10% of the area of the inlet 82 according to the following equation:

$$\frac{\pi * ([D1])^2}{4} \quad (2)$$

The pre-rotational element 88 defines a curvilinear flow path, and is characterized by constant, decreasing or increasing cross-section from the inlet cross-section S1 to the outlet cross-section S2. The ratio between outlet cross-section from controlled pre-rotational element (S2) and the inlet cross-section (S1) is in certain embodiments in the range of $0.7 \leq S2/S1 \leq 1.4$.

The rotational velocity of the mixture is dependent on the radius of curvature (R1) of the center-line of the pre-rotational element 88 where the center-line is defined as a curvilinear line joining all the center points of successive cross-sectional surfaces of the pre-rotational element 88. In certain embodiments the radius of curvature (R1) is in the range of $2 \leq R1/D1 \leq 6$ with opening angle in the range of $150° \leq \alpha R1 \leq 250°$.

The cross-sectional shape at the inlet section S1, although depicted as generally square, can be a rectangle, a rounded rectangle, a circle, an oval, or other rectilinear, curvilinear or a combination of the aforementioned shapes. In certain embodiments, the shape of the cross-section along the curvilinear path of the pre-rotational element 88 through which the fluid passes progressively changes, for instance, from a generally square shape to a rectangular shape. The progressively changing cross-section of element 88 into a rectangular shape advantageously maximizes the opening area, thus allowing the gas to separate from the liquid mixture at an early stage and to attain a uniform velocity profile and minimize shear stresses in the fluid flow.

The fluid flow from the controlled pre-rotational element 88 from cross-section (S2) passes section (S3) through the connection element to the controlled cyclonic vertical section 90. The connection element includes an opening region that is open and connected to, or integral with, an inlet in the controlled cyclonic vertical section 90. The fluid flow enters the controlled cyclonic vertical section 90 at a high rotational velocity to generate the cyclonic effect. The ratio between connection element outlet cross-section (S3) and inlet cross-section (S2) in certain embodiments is in the range of $2 \leq S3/S1 \leq 5$.

The mixture at a high rotational velocity enters the cyclonic vertical section 90. Kinetic energy is decreased and the vapor separates from the liquid under the cyclonic effect. Cyclones form in the upper level 90a and the lower level 90b of the cyclonic vertical section 90. In the upper level 90a, the mixture is characterized by a high concentration of vapor, while in the lower level 90b the mixture is characterized by a high concentration of liquid.

In certain embodiments, the internal diameter D2 of the cyclonic vertical section 90 is within the range of $2 \leq D2/D1 \leq 5$ and can be constant along its height, the length (LU) of the upper portion 90a is in the range of $1.2 \leq LU/D2 \leq 3$, and the length (LL) of the lower portion 90b is in the range of $2 \leq LL/D2 \leq 5$.

The end of the cyclonic vertical section 90 proximate vapor outlet 84 is connected to a partially open release riser and connected to the pyrolysis section of the steam pyrolysis unit. The diameter (DV) of the partially open release is in certain embodiments in the range of $0.05 \leq DV/D2 \leq 0.4$.

Accordingly, in certain embodiments, and depending on the properties of the incoming mixture, a large volume fraction of the vapor therein exits device 80 from the outlet 84 through the partially open release pipe with a diameter DV. The liquid phase (e.g., residue) with a low or non-existent vapor concentration exits through a bottom portion of the cyclonic vertical section 90 having a cross-sectional area S4, and is collected in the liquid collector and settling pipe 92.

The connection area between the cyclonic vertical section 90 and the liquid collector and settling pipe 92 has an angle in certain embodiments of 90°. In certain embodiments the internal diameter of the liquid collector and settling pipe 92 is in the range of $2 \leq D3/D1 \leq 4$ and is constant across the pipe length, and the length (LH) of the liquid collector and settling pipe 92 is in the range of $1.2 \leq LH/D3 \leq 5$. The liquid with low vapor volume fraction is removed from the apparatus through pipe 86 having a diameter of DL, which in certain embodiments is in the range of 0.05≤DL/D3≤0.4 and located at the bottom or proximate the bottom of the settling pipe.

In certain embodiments, a vapor-liquid separation device 18 or 36 is provided similar in operation and structure to device 80 without the liquid collector and settling pipe return portion. For instance, a vapor-liquid separation device 180 is used as inlet portion of a flash vessel 179, as shown in FIGS. 3A-3C. In these embodiments the bottom of the vessel 179 serves as a collection and settling zone for the recovered liquid portion from device 180.

In general a vapor phase is discharged through the top 194 of the flash vessel 179 and the liquid phase is recovered from the bottom 196 of the flash vessel 179. The vapor-liquid separation device 180 is economical to operate and maintenance free since it does not require power or chemical supplies. Device 180 comprises three ports including an inlet port 182 for receiving a vapor-liquid mixture, a vapor outlet port 184 for discharging separated vapor and a liquid outlet port 186 for discharging separated liquid. Device 180 operates based on a combination of phenomena including conversion of the linear velocity of the incoming mixture into a rotational velocity by the global flow pre-rotational section, a controlled centrifugal effect to pre-separate the vapor from liquid, and a cyclonic effect to promote separation of vapor from the liquid. To attain these effects, device 180 includes a pre-rotational zone 188 and a controlled cyclonic vertical section 190 having an upper portion 190a and a lower portion 190b. The vapor portion having low liquid volume fraction is discharged through the vapor outlet port 184 having a diameter (DV). Upper portion 190a which is partially or totally open and has an internal diameter (DII) in certain embodiments in the range of 0.5<DV/DII<1.3. The liquid portion with low vapor volume fraction is discharged from liquid port 186 having an internal diameter (DL) in certain embodiments in the range of 0.1<DL/DII<1.1. The liquid portion is collected and discharged from the bottom of flash vessel 179.

In order to enhance and to control phase separation, generally by depressing the boiling points of the hydrocarbons and reducing coke formation, heating steam is added to the feed to the vapor-liquid separation device 80 or 180. The feeds can also be heated by conventional heat exchangers as is known to those of ordinary skill in the art. The temperature of the feed to device 80 or 180 is adjusted so that the desired residue fraction is discharged as the liquid portion, e.g., in the range of about 350° C. to about 600° C.

While the various members of the vapor-liquid separation devices are described separately and with separate portions, it will be understood by one of ordinary skill in the art that apparatus 80 or apparatus 180 can be formed as a monolithic structure, e.g., it can be cast or molded, or it can be assembled from separate parts, e.g., by welding or otherwise attaching separate components together which may or may not correspond precisely to the members and portions described herein.

The vapor-liquid separation devices described herein can be designed to accommodate a certain flow rate and composition to achieve desired separation, e.g., at 540° C. In one example, for a total flow rate of 2002 m³/day at 540° C. and 2.6 bar, and a flow composition at the inlet of 7% liquid, 38% vapor and 55% steam with a density of 729.5 kg/m³, 7.62 kg/m³ and 0.6941 kg/m³, respectively, suitable dimensions for device 80 (in the absence of a flash vessel) includes D1=5.25 cm; S1=37.2 cm²; S1=S2=37.2 cm²; S3=100 cm²; αR1=213°; R1=14.5 cm; D2=20.3 cm; LU=27 cm; LL=38 cm; LH=34 cm; DL=5.25 cm; DV=1.6 cm; and D3=20.3 cm.

For the same flow rate and characteristics, a device 180 used in a flash vessel includes D1=5.25 cm; DV=20.3 cm; DL=6 cm; and DII=20.3 cm.

It will be appreciated that although various dimensions are set forth as diameters, these values can also be equivalent effective diameters in embodiments in which the components parts are not cylindrical.

Mixed product stream 39 is passed to the inlet of quenching zone 40 with a quenching solution 42 (e.g., water and/or pyrolysis fuel oil) introduced via a separate inlet to produce an intermediate quenched mixed product stream 44 having a reduced temperature, e.g., of about 300° C., and spent quenching solution 46 is discharged. The gas mixture effluent 39 from the cracker is typically a mixture of hydrogen, methane, hydrocarbons, carbon dioxide and hydrogen sulfide. After cooling with water or oil quench, mixture 44 is compressed in a multi-stage compressor zone 51, typically in 4-6 stages to produce a compressed gas mixture 52. The compressed gas mixture 52 is treated in a caustic treatment unit 53 to produce a gas mixture 54 depleted of hydrogen sulfide and carbon dioxide. The gas mixture 54 is further compressed in a compressor zone 55, and the resulting cracked gas 56 typically undergoes a cryogenic treatment in unit 57 to be dehydrated, and is further dried by use of molecular sieves.

The cold cracked gas stream 58 from unit 57 is passed to a de-methanizer tower 59, from which an overhead stream 60 is produced containing hydrogen and methane from the cracked gas stream. The bottoms stream 65 from de-methanizer tower 59 is then sent for further processing in product separation zone 70, comprising fractionation towers including de-ethanizer, de-propanizer and de-butanizer towers. Process configurations with a different sequence of de-methanizer, de-ethanizer, de-propanizer and de-butanizer can also be employed.

According to the processes herein, after separation from methane at the de-methanizer tower 59 and hydrogen recovery in unit 61, hydrogen 62 having a purity of typically 80-95 vol % is obtained. Recovery methods in unit 61 include cryogenic recovery (e.g., at a temperature of about −157° C.). Hydrogen stream 62 is then passed to a hydrogen purification unit 64, such as a pressure swing adsorption (PSA) unit to obtain a hydrogen stream 2 having a purity of 99.9%+, or a membrane separation units to obtain a hydrogen stream 2 with a purity of about 95%. The purified hydrogen stream 2 is then recycled back to serve as a major portion of the requisite hydrogen for the hydroprocessing reaction zone. In addition, a minor proportion can be utilized for the hydrogenation reactions of acetylene, methylacetylene and propadiene (not shown). In addition, according to the processes herein, methane stream 63 can optionally be recycled to the steam cracker to be used as fuel for burners and/or heaters (as indicated by dashed lines).

The bottoms stream 65 from de-methanizer tower 59 is conveyed to the inlet of product separation zone 70 to be separated into, methane, ethylene, propylene, butadiene, mixed butylenes and pyrolysis gasoline discharged via 78, 77, 76, 75, 74 and 73, respectively. Pyrolysis gasoline generally includes C5-C9 hydrocarbons, and aromatics including benzene, toluene and xylene can be extracted from this cut. Hydrogen is passed to an inlet of hydrogen purification zone 64 to produce a high quality hydrogen gas stream 2 that is discharged via its outlet and recycled to the inlet of hydroprocessing reaction zone 4. Pyrolysis fuel oil is discharged via outlet 71 (e.g., materials boiling at a temperature higher than the boiling point of the lowest boiling C10 compound, known as a "C10+" stream) which can be used as a pyrolysis fuel oil blend, e.g., a low sulfur fuel oil blend to be further processed in an off-site refinery. Further, as shown herein, fuel oil 72 (which can be all or a portion of pyrolysis fuel oil 71), can be introduced to the slurry hydroprocessing zone 22 via a blending zone 20.

The feed to the slurry hydroprocessing zone includes combinations of streams 19, 38 and/or 72 as described herein. This material is processed in slurry hydroprocessing zone 22, optionally via a blending zone 20. In the blending zone 20, the residual liquid fraction(s) is/are mixed with a slurry unconverted residue 25 that include the catalyst active particles to form the feed of the slurry hydroprocessing zone 22. This feed is then upgraded in the slurry hydroprocessing zone 22 in the presence of hydrogen 23 to produce a slurry intermediate product 24 including middle distillates. In certain embodiments the slurry hydroprocessing zone 22 is under a common high pressure loop with one or more reactors in hydroprocessing zone 4. Slurry intermediate product 24 is recycled and mixed with the hydrotreated reactor effluent 10 before processing in the steam pyrolysis zone 30 for conversion.

The steam pyrolysis zone post-quench and separation effluent stream 65 is separated in a series of separation units 70 to produce the principal products 73-78, including methane, ethane, ethylene, propane, propylene, butane, butadiene, mixed butenes, gasoline, and fuel oil. The hydrogen stream 62 is passed through a hydrogen purification unit 64 to form a high quality hydrogen gas 2 for admixture with the feed to the hydroprocessing reaction unit 4.

In certain embodiments, hydroprocessing or hydrotreating processes can increase the paraffin content (or decrease the BMCI) of a feedstock by saturation followed by mild hydrocracking of aromatics, especially polyaromatics. When hydrotreating a crude oil, contaminants such as metals, sulfur and nitrogen can be removed by passing the feedstock through a series of layered catalysts that perform the catalytic functions of demetallization, desulfurization and/or denitrogenation.

In one embodiment, the sequence of catalysts to perform hydrodemetallization (HDM) and hydrodesulfurization (HDS) is as follows:

a. The catalyst in the HDM section are generally based on a gamma alumina support, with a surface area of about 140-240 $m^2/g$. This catalyst is best described as having a very high pore volume, e.g., in excess of 1 $cm^3/g$. The pore size itself is typically predominantly macroporous. This is required to provide a large capacity for the uptake of metals on the catalysts surface and optionally dopants. Typically the active metals on the catalyst surface are sulfides of Nickel and Molybdenum in the ratio Ni/Ni+Mo<0.15. The concentration of Nickel is lower on the HDM catalyst than other catalysts as some Nickel and Vanadium is anticipated to be deposited from the feedstock itself during the removal, acting as catalyst. The dopant used can be one or more of phosphorus (see, e.g., United States Patent Publication Number US 2005/0211603 which is incorporated by reference herein), boron, silicon and halogens. The catalyst can be in the form of alumina extrudates or alumina beads. In certain embodiments alumina beads are used to facilitate unloading of the catalyst HDM beds in the reactor as the metals uptake will be ranged between from 30 to 100% at the top of the bed.

b. An intermediate catalyst can also be used to perform a transition between the HDM and HDS function. It has intermediate metals loadings and pore size distribution. The catalyst in the HDM/HDS reactor is essentially alumina based support in the form of extrudates, optionally at least one catalytic metal from group VI (e.g., molybdenum and/or tungsten), and/or at least one catalytic metals from group VIII (e.g., nickel and/or cobalt). The catalyst also contains optionally at least one dopant selected from boron, phosphorous, halogens and silicon. Physical properties include a surface area of about 140-200 $m^2/g$, a pore volume of at least 0.6 $cm^3/g$ and pores which are mesoporous and in the range of 12 to 50 nm.

c. The catalyst in the HDS section can include those having gamma alumina based support materials, with typical surface area towards the higher end of the HDM range, e.g. about ranging from 180-240 $m^2/g$. This required higher surface for HDS results in relatively smaller pore volume, e.g., lower than 1 $cm^3/g$. The catalyst contains at least one element from group VI, such as molybdenum and at least one element from group VIII, such as nickel. The catalyst also comprises at least one dopant selected from boron, phosphorous, silicon and halogens. In certain embodiments cobalt is used to provide relatively higher levels of desulfurization. The metals loading for the active phase is higher as the required activity is higher, such that the molar ratio of Ni/Ni+Mo is in the range of from 0.1 to 0.3 and the (Co+Ni)/Mo molar ratio is in the range of from 0.25 to 0.85.

d. A final catalyst (which could optionally replace the second and third catalyst) is designed to perform hydrogenation of the feedstock (rather than a primary function of hydrodesulfurization), for instance as described in Appl. Catal. A General, 204 (2000) 251. The catalyst will be also promoted by Ni and the support will be wide pore gamma alumina. Physical properties include a surface area towards the higher end of the HDM range, e.g., 180-240 $m^2/g$. This required higher surface for HDS results in relatively smaller pore volume, e.g., lower than 1 $cm^3/g$.

The method and system herein provides improvements over known steam pyrolysis cracking processes:
  use of crude oil as a feedstock to produce petrochemicals such as olefins and aromatics;
  coke precursors are significantly removed from the initial whole crude oil which allows a decreased coke formation in the radiant coil of the steam pyrolysis unit;
  additional impurities such as metals, sulfur and nitrogen compounds are also significantly removed from the starting feed which avoids post treatments of the final products.

In addition, hydrogen produced from the steam cracking zone is recycled to the hydroprocessing zone to minimize the demand for fresh hydrogen. In certain embodiments the integrated systems described herein only require fresh hydrogen to initiate the operation. Once the reaction reaches the equilibrium, the hydrogen purification system can provide enough high purity hydrogen to maintain the operation of the entire system.

EXAMPLE

Below is an example of the process disclosed herein. Table 1 shows the properties of conventional hydrotreatment step with Arab Light crude as the feedstock.

TABLE 1

| Sample | Sulfur (wt %) | Nitrogen (ppm) | Total Hydrogen (wt %) | Density |
|---|---|---|---|---|
| Arab Light | 1.94 | 961 | 12.55 | 0.8584 |
| Hydrotreated Arab Light | 0.0416 | 306 | 13.50 | 0.8435 |

Table 2 below is the results from the treatment of Arab Light following the slurry hydrotreating process using oil dispersed catalyst disclosed. This process can be optimized to achieve higher degree of conversion and desulfurization.

TABLE 2

| Sample | Sulfur (wt %) | 500° C.+ |
|---|---|---|
| Arab Heavy | 3.1 | 55.4% |
| Slurry hydrotreated Arab Heavy | 0.93 | 23.6% |

Table 3 shows predicted petrochemical yields from steam cracking of upgraded Arab Light utilizing conventional hydrotreatment steps.

TABLE 3

| Product | Yield, Wt % FF |
|---|---|
| $H_2$ | 0.6% |
| Methane | 10.8% |
| Acetylene | 0.3% |
| Ethylene | 23.2% |
| Ethane | 3.6% |
| Methyl Acetylene | 0.3% |
| Propadiene | 0.2% |
| Propylene | 13.3% |
| Propane | 0.5% |
| Butadiene | 4.9% |
| Butane | 0.1% |
| Butenes | 4.2% |
| Pyrolysis Gasoline | 21.4% |
| Pyrolysis Fuel Oil | 16.4% |

The method and system of the present invention have been described above and in the attached drawings; however, modifications will be apparent to those of ordinary skill in the art and the scope of protection for the invention is to be defined by the claims that follow.

The invention claimed is:

1. An integrated hydroprocessing, steam pyrolysis and slurry hydroprocessing process for direct conversion of crude oil to produce olefinic and aromatic petrochemicals, the process comprising:
  a. hydroprocessing the crude oil in the presence of hydrogen under conditions effective to produce a hydroprocessed effluent having a reduced content of contaminants, an increased paraffinicity, reduced Bureau of Mines Correlation Index, and an increased American Petroleum Institute gravity;
  b. thermally cracking hydroprocessed effluent and a slurry process product in the presence of steam in a steam pyrolysis zone under conditions effective to produce a mixed product stream;
  c. processing residuals or bottoms derived from one or more of the hydroprocessed effluent, a heated stream within the steam pyrolysis zone, or the mixed product stream, in a slurry hydroprocessing zone to produce the slurry process product;
  d. separating the mixed product stream;
  e. purifying hydrogen recovered in step (d) and recycling it to the step of hydroprocessing; and
  f. recovering olefins and aromatics from at least a portion of the separated mixed product stream.

2. The integrated process of claim 1, further comprising recovering pyrolysis fuel oil from at least a portion of the mixed product stream for use as at least a portion of the residual or bottoms cracked in step (c).

3. The integrated process of claim 1, further comprising separating the hydroprocessed effluent from step (a) into a vapor phase and a liquid phase in a vapor-liquid separation zone, wherein the vapor phase is thermally cracked in step (b), and at least a portion of the liquid phase is processed in step (c).

4. The integrated process of claim 3, wherein the vapor-liquid separation zone is a flash separation apparatus.

5. The integrated process of claim 3, wherein the vapor-liquid separation zone is a physical or mechanical apparatus for separation of vapors and liquids.

6. The integrated process of claim 3, wherein the vapor-liquid separation zone comprises a flash vessel having at its inlet a vapor-liquid separation device including
  a pre-rotational element having an entry portion and a transition portion, the entry portion having an inlet for receiving the hydroprocessed effluent and a curvilinear conduit,
  a controlled cyclonic section having
    an inlet adjoined to the pre-rotational element through convergence of the curvilinear conduit and the cyclonic section, and
    a riser section at an upper end of the cyclonic member through which vapors pass,
  wherein a bottom portion of the flash vessel serves as a collection and settling zone for the liquid phase prior to passage of all or a portion of said liquid phase to step (c).

7. The integrated process of claim 3, further comprising
  separating the hydroprocessed effluents in a high pressure separator to recover a gas portion that is cleaned and recycled to the hydroprocessing zone as an additional source of hydrogen, and a liquid portion, and
  separating the liquid portion derived from the high pressure separator into a gas portion and a liquid portion in a low pressure separator, wherein the liquid portion derived from the low pressure separator is the feed to the vapor-liquid separation zone and the gas portion derived from the low pressure separator is combined with the combined product stream after the steam pyrolysis zone and before separation in step (d).

8. The integrated process of claim 1, wherein step (b) further comprises heating hydroprocessed effluent in a convection section of the steam pyrolysis zone, separating the heated hydroprocessed effluent into a vapor phase and a liquid phase, passing the vapor phase to a pyrolysis section of the steam pyrolysis zone, and discharging the liquid phase for use as at least a portion of the residuals or bottoms processed in step (c).

9. The integrated process of claim 8 wherein separating the heated hydroprocessed effluent into a vapor phase and a liquid phase is with a vapor-liquid separation device based on physical and mechanical separation.

10. The integrated process of claim 9 wherein separating the heated hydroprocessed effluent into a vapor phase and a liquid phase is with a vapor-liquid separation device that includes
  a pre-rotational element having an entry portion and a transition portion, the entry portion having an inlet for receiving the heated hydroprocessed effluent and a curvilinear conduit,
  a controlled cyclonic section having
    an inlet adjoined to the pre-rotational element through convergence of the curvilinear conduit and the cyclonic section, a riser section at an upper end of the cyclonic member through which vapor phase passes; and
a liquid collector/settling section through which the liquid phase passes prior to conveyance of all or a portion of said liquid phase to step (c).

11. The integrated process of claim 1 wherein step (d) comprises
compressing the thermally cracked mixed product stream with plural compression stages;
subjecting the compressed thermally cracked mixed product stream to caustic treatment to produce a thermally cracked mixed product stream with a reduced content of hydrogen sulfide and carbon dioxide;
compressing the thermally cracked mixed product stream with a reduced content of hydrogen sulfide and carbon dioxide;
dehydrating the compressed thermally cracked mixed product stream with a reduced content of hydrogen sulfide and carbon dioxide;
recovering hydrogen from the dehydrated compressed thermally cracked mixed product stream with a reduced content of hydrogen sulfide and carbon dioxide; and
obtaining olefins and aromatics from the remainder of the dehydrated compressed thermally cracked mixed product stream with a reduced content of hydrogen sulfide and carbon dioxide; and step (e) comprises purifying recovered hydrogen from the dehydrated compressed thermally cracked mixed product stream with a reduced content of hydrogen sulfide and carbon dioxide for recycle to the hydroprocessing zone.

12. The integrated process of claim 11, wherein recovering hydrogen from the dehydrated compressed thermally cracked mixed product stream with a reduced content of hydrogen sulfide and carbon dioxide further comprises separately recovering methane for use as fuel for burners and/or heaters in the thermal cracking step.

13. The integrated process of claim 1, further comprising
separating the hydroprocessed effluents in a high pressure separator to recover a gas portion that is cleaned and recycled to the hydroprocessing zone as an additional source of hydrogen, and a liquid portion, and
separating the liquid portion derived from the high pressure separator into a gas portion and a liquid portion in a low pressure separator, wherein the liquid portion derived from the low pressure separator is the feed to the thermal cracking step and the gas portion derived from the low pressure separator is combined with the combined product stream after the steam pyrolysis zone and before separation in step (d).

* * * * *